Patented Mar. 26, 1946

2,397,430

UNITED STATES PATENT OFFICE 2,397,430

PROCESS OF DEVELOPING PIGMENT PROPERTIES OF TITANIUM DIOXIDE

David B. Pall, New York, N. Y., assignor, by mesne assignments, to American Cyanamid Company, a corporation of Maine No Drawing. Application December 8, 1941, Serial No. 422,099

3 Claims. (Cl. 23—202)

This invention relates to a method for accelerating the heat conversion of hydrated titanium salts to pigment titanium dioxide, and is directed specifically to a method in which the initial stages of calcination are conducted in a reducing atmosphere, followed by a further calcination in an oxidizing atmosphere. The invention also concerns a method of reducing discoloration in the practice of the calcination.

Titanium dioxide, within the thirty years since its introduction as a pigment, has made such rapid strides that it has become the outstanding white pigment used in the coating and allied industries; this popularity is due mainly to its whiteness, high hiding power, higher tinting strength and ready dispersibility in vehicles. It has been prepared in the past largely by the hydrolysis, under carefully controlled conditions, of titanium sulfate solutions containing iron, prepared by digestion of ilmenite (a native ferrous titanate) with sulfuric acid, followed by reduction of all ferric iron to ferrous iron, removal of a part of the iron by crystallization as ferrous sulfate, clarification and adjustment of concentration; the hydrolysate is calcined, together with conditioning agents, to produce the desired white pigment.

The calcination is an essential step in the production of a pigment. During the heating, the water and acid, free and combined with the hydrolyzed titanium dioxide, are expelled, and the titanium dioxide crystals are made to grow and develop pigment properties. Products calcined without mineralizer do not attain optimum pigment properties; it has therefore been necessary to add mineralizers, such as potassium carbonate, to insure the production of pigment of maximum hiding power and brightness.

With sulfate hydrolysates, calcination times of the order of 3 to 5 hours at 900 to 1000° C. have been customary in the art, to produce a pigment of anatase crystal structure, with good pigment properties. Under similar conditions, hydrolysates from titanium salts of acids with monovalent anions (e. g. chloride, nitrate) give rutile pigments which are higher in hiding power and tinting strength than the anatase pigments.

The anatase from sulfate precipitates can be converted to rutile by continued calcination; but ordinarily, the conversion occurs only long after optimum pigment properties are obtainable. The resultant rutile is low in tinting strength, and off-color, and so is not a satisfactory pigment. Nor can this conversion be hastened by the conventional mineralizers; they tend to retard it.

I have discovered a method of hastening the conversion of titanium dioxide hydrolysates to crystalline pigment materials which has no retarding effect on the conversion of anatase to rutile, and which method is therefore useful both in the preparation of anatase pigment, and in the preparation of rutile pigments.

My method comprises calcining the hydrolysate first under reducing conditions and then under oxidizing conditions, both at temperatures of the order of 850 to 1000° C. Under these conditions, the conversion to pigment is substantially accelerated, with no tendency to retard the conversion of anatase to rutile, as with conventional mineralizers.

The time spent in the reducing cycle of the calcination may vary from about ¼ to ⅔ of the overall time; the oxidation time may likewise vary from about ⅓ to ¾ of the total time. Preferably, an inert cycle is introduced between the reducing cycle and the oxidizing cycle, to eliminate any explosion hazard.

In the practice of the invention, there is a tendency for the pigment to show a grayish or bluish cast. I have found that this tendency can be overcome by the use of a small percentage of iron oxide (about .01–.03% $Fe_2O_3$) or copper oxide (from about .0004 to .0025% Cu).

The copper gives a somewhat brighter color than the iron, and is preferred by me.

I believe these materials act to prevent discoloration because they both occur as two oxides which are readily oxidizable or reducible, and act to accelerate reoxidation during the oxidation cycle.

These oxides are also useful in retarding the graying which seems to occur in the conversion of anatase to rutile by methods other than the reduction-oxidation method described in this application; I believe they act in a similar fashion in such conversion.

My method is useful in accelerating the ordinary conversion of sulfate precipitates to anatase where a mineralizer is employed. Thus,

EXAMPLE 1

Development of sulfate hydrolysate to anatase pigment with mineralizer

A conventional titanium sulfate hydrolysate containing 0.4% $K_2CO_3$, based on $TiO_2$, required one hour at 975° C. to develop optimum tinting strength; the same results were obtainable in the same time at a substantially lower temperature (950° C.) by the use of a cycle of 30 minutes hydrogen, 8 minutes nitrogen and 17 minutes air.

The difference of 25° C. represents a time advantage of approximately 50%. With lower percentages of mineralizer, the advantage is even more marked. Thus, using a roasted hydrolysate with less than 0.1% $K_2CO_3$, oxidation calcination took 4 hours at 975° C. to develop a maximum tinting strength of 1350; a product equivalent in tinting strength was obtained by heating at the same temperature in hydrogen for 3 minutes, in nitrogen for 2 minutes, and under air for 8 minutes.

EXAMPLE 2

Development of anatase pigment without mineralizer

A sample of conventional sulfate hydrolysate, calcined for 1 hour at 975° C. with 0.4% $K_2CO_3$, yielded a tinting strength of 1270. The same hydrolysate, calcined without $K_2CO_3$, under identical conditions, yielded a product of 1000 tinting strength. The same hydrolysate was neutralized with alkali and washed free of sulfates. Half of it was calcined under oxidizing conditions; it gave a maximum tinting strength of 1030. The second half was calcined at 920° C. in $H_2$ gas for 8 minutes, then in nitrogen for 2 minutes, and finally in air for 9 minutes; the tinting strength of the product was 1310.

For calcination without mineralizer, I have found that the neutralization of the hydrolysate is essential for the production of products of maximum tinting strength.

All of the above products produced by reduction-oxidation calcination were rather gray in cast; but the addition of about 0.01 to 0.03% $Fe_2O_3$ before calcination definitely improved the color. Still better results were obtained by the use of copper, in amounts as low as .0004%. Color improves as the copper increases to .002%; as the copper increases above .0025%, the discoloration caused by the copper oxide offsets the advantage gained by elimination of $Ti_2O_3$ from the precipitate.

My method is applicable to the calcination of chloride and the like hydrolysates which produce rutile. It can also be used in the conversion of anatase to rutile.

EXAMPLE 3

Conversion to rutile

Anatase may be converted to rutile by my method much more rapidly than by conventional calcination. Thus, a sulfate hydrolysate was made by adding 150 cc. of a titanium sulfate solution (containing 9.7% $TiO_2$, and a molar ratio of Ti ions to $SO_4$ ions of 1 to 2.2) to 100 cc. of boiling water, and continuing boiling for two hours. Small percentages (.002% as Cu based on $TiO_2$) of copper sulfate and of $K_2CO_3$ (0.4%) were added to the precipitate; it was calcined for about an hour at 925° C. (22 minutes $H_2$, 11 minutes $N_2$, 27 minutes air). X-ray analysis showed a 30 to 60% conversion to rutile.

The reducing atmosphere for the preliminary stages of the calcination can be obtained in various ways. Thus, sugar may be added to the sulfate pulp, and converted to charcoal; the initial calcination can then be carried out in a closed chamber, whereby an atmosphere of CO is maintained. This method is, however, extremely difficult to control; I prefer to use an atmosphere of a reducing gas—e. g. $H_2$, water gas, etc. The system is preferably flushed with inert gas (nitrogen, flue gas, etc.) before air is passed through. Most desirably, the reducing gas is used as fuel for the calciner, and the flue gases are recycled to flush the reducing gas out of the apparatus.

Obviously, the examples can be multiplied indefinitely without departing from the scope of the invention, which is defined in the claims.

I claim:

1. The method of producing a pigment containing rutile from hydrated titanium oxide by calcination at temperatures of the order of 900° C.–1000° C., which comprises calcining the pigment at such temperatures for a period of time in a reducing atmosphere, and then at essentially similar temperatures for a similar period of time in an oxidizing atmosphere, until a substantial rutile conversion has occurred, in the presence of from 0.01%–0.03% $Fe_2O_3$, based on the titanium dioxide.

2. The method of producing a pigment containing rutile from hydrated titanium oxide by calcination at temperatures of the order of 900° C.–1000° C., which comprises calcining the pigment at such temperatures for a period of time in a reducing atmosphere, and then at essentially similar temperatures for a similar period of time in an oxidizing atmosphere, until a substantial rutile conversion has occurred, in the presence of from .0004%–.0025% Cu, based on the titanium dioxide.

3. The method of accelerating pigment formation from hydrated titanium oxide by the action of heat, which comprises subjecting the hydrated product to high heat in the presence of a reducing atmosphere, and then to high heat in the presence of an oxidizing atmosphere, in the presence of from .0004% to .0025% Cu, based on the titanium dioxide.

DAVID B. PALL.